United States Patent
Achart et al.

(10) Patent No.: US 7,479,744 B2
(45) Date of Patent: Jan. 20, 2009

(54) POWER DIMMER

(75) Inventors: Raynald Achart, Pernay (FR); Laurent Gonthier, Tours (FR)

(73) Assignee: STMicroelectronics S.A., Montrouge (FR)

( * ) Notice: Subject to any disclaimer, the term of this patent is extended or adjusted under 35 U.S.C. 154(b) by 0 days.

(21) Appl. No.: 11/998,161

(22) Filed: Nov. 28, 2007

(65) Prior Publication Data
US 2008/0157747 A1    Jul. 3, 2008

Related U.S. Application Data

(63) Continuation of application No. 11/655,754, filed on Jan. 19, 2007, now abandoned, which is a continuation of application No. 11/166,566, filed on Jun. 24, 2005, now abandoned.

(30) Foreign Application Priority Data

Jun. 24, 2004    (FR)    ................................... 04 51322

(51) Int. Cl.
*G05F 1/10* (2006.01)
(52) U.S. Cl. ....................... 315/307; 323/235; 323/902; 323/905
(58) Field of Classification Search .................. 323/902, 323/905, 235; 315/307
See application file for complete search history.

(56) References Cited

U.S. PATENT DOCUMENTS

| 4,520,295 A | 5/1985 | Bolhuis |
| 4,797,599 A | 1/1989 | Ference et al. |
| 4,870,340 A | 9/1989 | Kral |
| 5,072,170 A | 12/1991 | Crane et al. |
| 5,182,702 A * | 1/1993 | Hiramatsu et al. .......... 363/132 |
| 2004/0135618 A1 | 7/2004 | Peron |

OTHER PUBLICATIONS

French Search Report from French Patent Application No. 04/51322, filed Jun. 24, 2004.

* cited by examiner

*Primary Examiner*—Shawn Riley
(74) *Attorney, Agent, or Firm*—Lisa K. Jorgenson; James H. Morris; Wolf, Greenfield & Sacks, P.C.

(57) ABSTRACT

A circuit for controlling the power in a load supplied by an A.C. voltage and directly connected to a first terminal of application of the A.C. voltage, including two isolated-gate bipolar transistors, connected in anti-parallel between a second terminal of application of the A.C. voltage and the load; circuitry for detecting the zero crossing of the A.C. supply voltage in a first direction; circuitry for generating, at each period of the supply voltage, a pulse of predetermined duration for controlling a first one of said transistors, the time of occurrence of the pulse being conditioned by the detection of the zero crossing of the A.C. voltage and by a desired power reference setting a variable delay of occurrence of the pulse with respect to the detected zero crossing; and circuitry for inverting and transferring said pulse to the second transistor.

17 Claims, 3 Drawing Sheets

POWER DIMMER

CROSS REFERENCE TO RELATED APPLICATIONS

This application is a continuation of U.S. application Ser. No. 11/655,754, filed Jan. 19, 2007 which is a continuation of U.S. application Ser. No. 11/166,566, filed Jun. 24, 2005 entitled POWER DIMMER, both prior applications are incorporated herein by reference in their entirety.

BACKGROUND OF THE INVENTION

1. Field of the Invention

The present invention relates to the field of power dimmers for controlling a load supplied from an A.C. voltage, generally the mains voltage of the electric supply system.

2. Discussion of the Related Art

Among known power dimmers, two MOS power transistors assembled in anti-series with the load to be controlled can be used, each transistor being in antiparallel with a high-voltage diode and being dedicated to one of the halfwaves of the supply voltage. To properly control these transistors, a first known technique consists of using a microprocessor to execute a digital control. A second known (analog) technique uses two operational amplifiers and requires two additional high-voltage diodes to detect the zero crossing of the mains voltage.

One problem linked to the use of two transistors in anti-series is that it is necessary to control these transistors at a frequency which is twice the supply voltage frequency (once for each halfwave).

Another problem is that the turning-off at the current zero or the turning-on at the voltage zero is not natural and must be controlled.

SUMMARY OF THE INVENTION

The present invention aims at providing a power dimmer which overcomes some of the disadvantages of known solutions. In particular, the present invention aims at providing a dimmer that does not require controlling the power switches at a frequency which is twice the A.C. supply frequency.

The present invention also aims at ensuring a spontaneous turning-off at the current zero or a spontaneous turning-on at the voltage zero.

The present invention also aims at providing a low-cost solution which is simple to implement and which, in particular, dose not require four high-voltage diodes. In a preferred implementation, the present invention also aims at avoiding the use of a microcontroller.

To achieve these and other objects, the present invention provides a circuit for controlling the power in a load supplied by an A.C. voltage and directly connected to a first terminal of application of the A.C. voltage, comprising:

two isolated-gate bipolar transistors, connected in antiparallel between a second terminal of application of the A.C. voltage and the load;

means for detecting the zero crossing of the A.C. supply voltage in a first direction;

means for generating, at each period of the supply voltage, a pulse of predetermined time duration for controlling a first one of said transistors, the time of occurrence of the pulse being conditioned by the detection of the zero crossing of the A.C. voltage and by a desired power reference setting a variable delay of occurrence of the pulse with respect to the detected zero crossing; and means for inverting and transferring said pulse to the second transistor.

According to an embodiment of the present invention, said predetermined duration corresponds to a half-period of the A.C. supply voltage.

According to an embodiment of the present invention, said inversion and transfer means comprises an optocoupler.

According to an embodiment of the present invention, said generation means comprises a comparator providing a signal for controlling the gate of the first transistor, the turning-off of which is conditioned by said variable delay initialized by said detection circuit.

According to an embodiment of the present invention, said variable delay upon turning-off of the first transistor is obtained by a resistive and capacitive cell having its resistance conditioned by a potentiometer and having its charge controlled by said detection circuit.

According to an embodiment of the present invention, said pulse of predetermined time duration is obtained by means of said comparator by a resistive and capacitive discharge of the same capacitor as that setting the variable delay.

According to an embodiment of the present invention, the control circuit further comprises a starting circuit.

According to an embodiment of the present invention, applied to the control of a resistive and capacitive load, the occurrence of said pulse turns off said first transistor.

According to an embodiment of the present invention, applied to the control of a resistive and capacitive load, the occurrence of said pulse turns on said first transistor.

The foregoing objects, features, and advantages of the present invention will be discussed in detail in the following non-limiting description of specific embodiments in connection with the accompanying drawings.

DETAILED DESCRIPTION

Figure 1:
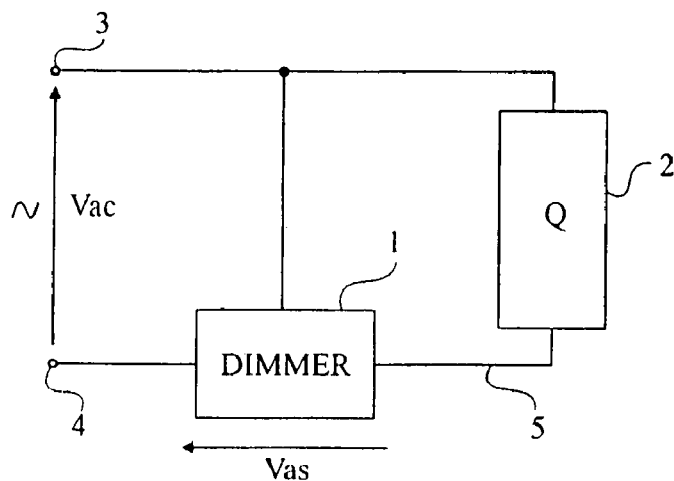
FIG. 1 very schematically shows the assembly of a power dimmer according to the present invention in a load control circuit.

The same elements have been referred to with the same reference numerals in the different drawings. For clarity, only those elements that are necessary to the understanding of the present invention have been shown in the drawings and will be described hereafter. In particular, the load controlled by a dimmer of the present invention has not been described in detail. The dimmer of the present invention can be used whatever the series-connected load.

A feature of the present invention is to connect, in series with the load to be controlled, two isolated-gate bipolar transistors. Such transistors are known as RB-IGBTs (Reverse-blocking isolated gate bipolar transistor). According to the present invention, these transistors are connected in antiparallel and are controlled by using a control at the voltage zero (for a resistive or resistive and capacitive load) or at the current zero (for a resistive and inductive load) at the mains frequency. RB-IGBT transistors hold the reverse voltage, which enables using them in antiparallel without it being necessary to add an additional diode thereto.

The fact of using RB-IGBT transistors enables using a control signal and its inverse for the two transistors, and obtaining natural switchings at the current zero or at the voltage zero.

FIG. 1 very schematically shows the assembly of a power dimmer 1 (DIMMER) in its application environment. Dimmer 1 is intended to be series-connected with a load 2 (Q) that it controls between two terminals 3 and 4 of application of an A.C. supply voltage Vac, for example, the electric supply system. For example, the dimmer comprises three terminals of connection to the outside. Two terminals are intended to be connected to terminals 3 and 4 of application of the A.C. voltage and a third terminal 5 is intended to be connected to controlled load 2, the other terminal of the load being directly connected to one (for example, 3) of the terminals of application of A.C. voltage Vac. As an alternative, if another type of power supply is used, dimmer 1 only comprises two terminals of connection to terminals 4 and 5.

Figure 2:
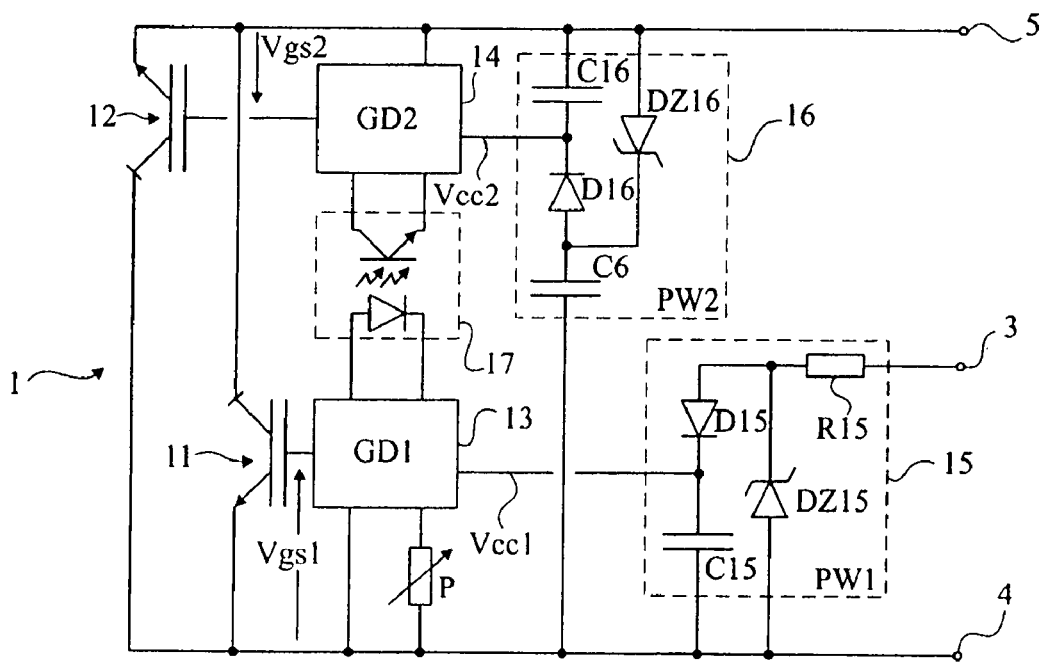
FIG. 2 is a simplified electric diagram of a power dimmer according to an embodiment of the present invention.

FIG. 2 schematically and partially shows in the form of blocks an embodiment of a power dimmer 1 according to the present invention in the case of an RC load.

Dimmer 1 essentially comprises two power switches 11 and 12 connected in antiparallel between terminals 4 and 5 intended to be series-connected with the load. Switches 11 and 12 are RB-IGBT transistors. In the example of FIG. 2, a first transistor 11 is unidirectional for the current from terminal 5 to terminal 4. Second transistor 12 is unidirectional for the current from terminal 4 to terminal 5.

Functionally, each transistor 11, 12 is controlled by a circuit 13 (GD1), respectively 14 (GD2) for providing a control signal, respectively Vgs1 and Vgs2, on its gate. Circuit 13 for controlling transistor 11 is supplied by a circuit 15 (PW1) for providing a D.C. voltage Vcc1 from the voltage present between terminals 3 and 4. Circuit 14 is supplied with a second D.C. voltage Vcc2 provided by a circuit 16 (PW2) for extracting this supply voltage from the voltage present between terminals 4 and 5. The need for two different supply voltages for control circuits 13 and 14 is linked to the absence of a common reference voltage for the two circuits.

According to the present invention, the power variation control is imposed to one of the two circuits (for example, circuit 13) by means of a potentiometer P or the like. This control is transmitted, via an isolation barrier preferably formed of an optocoupler 17, to circuit 14.

Preferably, circuit 15 for supplying circuit 13 considered as non-floating (that is, referenced to terminal 4, which generally corresponds to the neutral of voltage Vac) is a circuit of resistive type. For example, a resistor R15 is in series with a diode D15 and a capacitor C15 between terminals 3 and 4. A Zener diode DZ15 setting voltage level Vcc1 is connected between the anode of diode D15 (connected to resistor R15) and terminal 4. Voltage Vcc1 is sampled at the connection node between diode D15 (cathode) and capacitor C15. By designating as positive the halfwaves of voltage Vac in which the voltage at terminal 3 is greater than the voltage at terminal 4, capacitor C15 is charged during each positive halfwave of voltage Vac. Diode D15 has the function of preventing a discharge of capacitor C15 in the A.C. power supply during negative halfwaves.

On the side of floating control circuit 14 (having one of its terminals connected to load 2), a supply circuit 16 of capacitive type is preferably provided. For example, circuit 16 comprises a capacitor C16 in series with a diode D16 and a capacitor C6 between terminals 5 and 4, capacitor C6 playing the function of resistor R15 of circuit 15. A zener diode DZ16 is connected between terminal 5 and the anode of diode D16 connected to capacitor C6. Diode DZ16 sets supply voltage Vcc2 provided by circuit 16, which is sampled at the cathode of diode D16. Circuit 16 stores the power in its capacitor C16 only during periods when transistor 12 is off.

As will be seen hereafter, the present invention takes advantage from the fact that switches 11 and 12 have the feature of turning on only if two conditions are simultaneously fulfilled, that is, in the presence of a positive gate control signal Vgs and an anode-source voltage Vas which is also positive. This enables simplifying the control.

Figure 3:
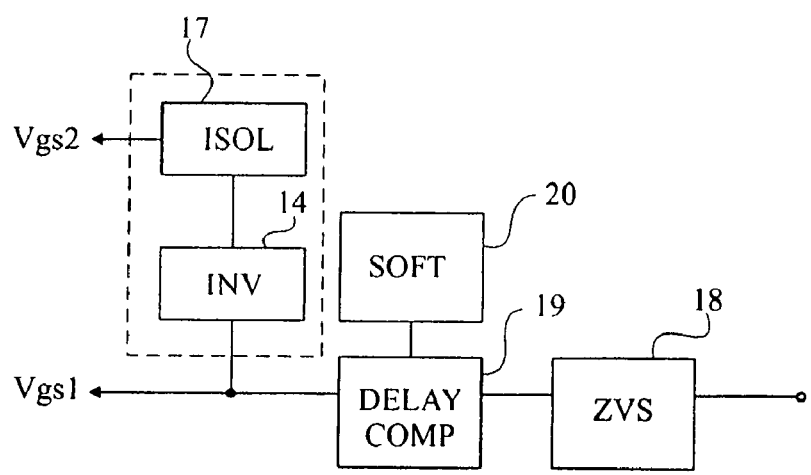
FIG. 3 illustrates in the form of blocs the functions performed by the circuit for controlling the two power switches of the dimmer according to the present invention.

FIG. 3 schematically shows in the form of blocks the main functions of a control circuit according to an embodiment of the present invention. For simplification, it is assumed that these circuits are supplied by appropriate voltages Vcc1 and Vcc2 as will be discussed hereafter in relation with FIG. 5.

Gate control signal Vgs1 of first RG-IGBT transistor 11 is, in the case of a resistive or resistive and capacitive load, provided from a detection of the zero crossing of the supply voltage in the negative-to-positive direction with the voltage orientation taken in the drawings (block 18, ZVS). This detection of the voltage zero starts a delay element (block 19, DELAY COMP) having its value conditioned by the reference set, for example, by potentiometer P (FIG. 2). Circuit 19 has the function, in the case of an RC load control, on the one hand of canceling gate control Vgs1 once the achieved delay forms a first variable dwell and, on the other hand, reactivating the gate control at the end of a second fixed predetermined dwell. The suppression of voltage Vgs1 at the end of the variable dwell turns off (blocks) transistor 11. The same signal, inverted by an inverter 14 (INV), is transmitted by isolation barrier 17 (ISOL) to the gate of transistor 12 in the form of a signal Vgs2. Thus, transistor 12 is controlled to be turned on (provided that its anode-source voltage is positive) at the time when transistor 11 blocks. This turn-on voltage is maintained as long as block 19 does not invert back gate signal Vgs1 at the end of a predetermined dwell (determined in a setting of the circuit). This fixed dwell is preferentially selected to correspond to a half-period of the A.C. supply voltage and must, more generally, respect the condition that, when added to the maximum turn-off delay of transistor 11, the total duration does not exceed the period of the A.C. supply voltage. The fixed dwell enables being content with a detection of the zero voltage crossing in a single direction, and thus generating a control signal at the A.C. voltage frequency (rather than at a double frequency).

As an alternative, for an inductive load, signal Vgs1 is provided, with respect to the zero crossing, after a delay conditioned by potentiometer P, and is canceled after the fixed dwell preferentially corresponding to a half-period.

Preferably, a soft starting circuit 20 (SOFT) is provided to progressively lengthen the on periods of the transistors to reach the duration set by the potentiometer (or by means of an analog reference value).

FIGS. 4A to 4G illustrate, in the form of timing diagrams, the operation of the power dimmer according to the present invention such as shown in FIGS. 2 and 3. FIG. 4A shows an example of the shape of voltage Vas between terminals 5 and 4 (anode and source of transistor 11). FIGS. 4B and 4C respectively show gate control voltages Vgs1 and Vgs2 of transistors 11 and 12. FIG. 4D shows current I between terminals 5 and 4 (that is, in the controlled load) with, by convention, a positive current in transistor 11. FIG. 4E shows signal ZVS provided by circuit 18 for detecting the voltage zero in the positive direction. FIG. 4F shows voltage $V_P$ provided at the input of the comparator of block 19. FIG. 4G shows dwell signal TEMPO setting the predetermined turn-off control delay (here, a half-period of voltage Vac) of transistor 12.

For simplification, the on-state voltage drops of the different elements of the control circuit as well as the respective signal settling times have not been taken into account. In FIG. 4A, the shape of voltage Vac is illustrated in dotted lines.

A steady-state operation is assumed, in which, as will be seen hereafter, gate voltage Vgs1 (FIG. 4B) is at the high level at the end of the negative halfwave of the supply voltage.

Just before a time t0 corresponding to the zero crossing of voltage Vac towards the positive halfwave, voltage Vgs1 is at the high level, voltage Vgs2 is low. Transistor 11 is, however, blocked since its anode-source voltage is negative. At time t0, transistor 11 starts conducting, the voltage applied thereacross becoming positive. Accordingly, voltage Vas cancels. A current I then flows through the load. In FIG. 4D, a linear growth of the current has been arbitrarily assumed from time t0. Further, signal ZVS (FIG. 4E) of detection of the zero crossing towards positive halfwaves switches to the low state, starting the delay element of the variable dwell. A delay of duration D at the end of which signal $V_P$ switches to the high state is assumed. In practice, signal $V_P$ starts increasing from as soon as time t0 by a capacitive charge through potentiometer P, to reach a threshold TH for triggering a comparator at time t1. Predetermined threshold TH is selected according to the power variation range desired for the circuit, so that according to the value given to setting potentiometer P, threshold TH is reached at a different time of the positive halfwave of voltage Vac. This effect has however been neglected in FIG. 4F. Transistor 12 remains off since its gate control signal is zero (its anode-source voltage is further negative).

At time t1, gate control signal Vgs1 of transistor 11 disappears under the effect of the comparator of block 19. Accordingly, current I disappears and voltage Vas reaches supply voltage Vac. Gate control signal Vgs2 of transistor 12 switches high. Transistor 12 however remains off since its anode-source voltage is negative.

At a time t2 corresponding to the zero crossing towards the negative halfwave, transistor 12 starts conducting and a current I appears in the load (negative current in the orientation taken in the drawings). Signal ZVS remains low since it only detects crossings towards positive halfwaves. It has been assumed for simplification that signal $V_P$ remains at level TH between times t1 and t2. In practice, its level decreases if the dwells are obtained by means of resistive and capacitive elements. This has however no incidence upon the operation, provided that it remains beyond the low switching threshold of the comparator of element 19.

According to this embodiment of the present invention, dwell TEMPO (FIG. 4G) of fixed duration is triggered at each turning-off of transistor 11 by the disappearing of its gate voltage (time t1). This dwell has a predetermined value preferably corresponding to a half-period of A.C. supply voltage Vac. For example, the dwell is set to approximately 10 milliseconds for a 50-Hz mains frequency and to approximately 8.3 milliseconds for a 60-Hz mains. At the end of this dwell (time t3), element 19 switches gate voltage Vgs1 of transistor 11 back to the high state (the effect of a capacitive discharge has been neglected). This results in a blocking of transistor 12 by the switching to the low state of voltage Vgs2. Further, the expiry of the dwell causes the setting to the high state of voltage zero detection signal ZVS as well as a resetting of signal Vp (in practice, a quasi-full discharge of the capacitor storing voltage Vp). It should be noted that, although signal Vgs1 has switched back to the high state, transistor 11 remains off since it is a negative halfwave.

At the next zero crossing (time t0') towards a positive halfwave, transistor 11 turns back on and the operation described in relation with times t0, t1, t2, and t3 is repeated for times t0', t1', t2', and t3'. Why, in steady state, signal Vgs1 is high before time t0 here becomes apparent.

Figure 4:
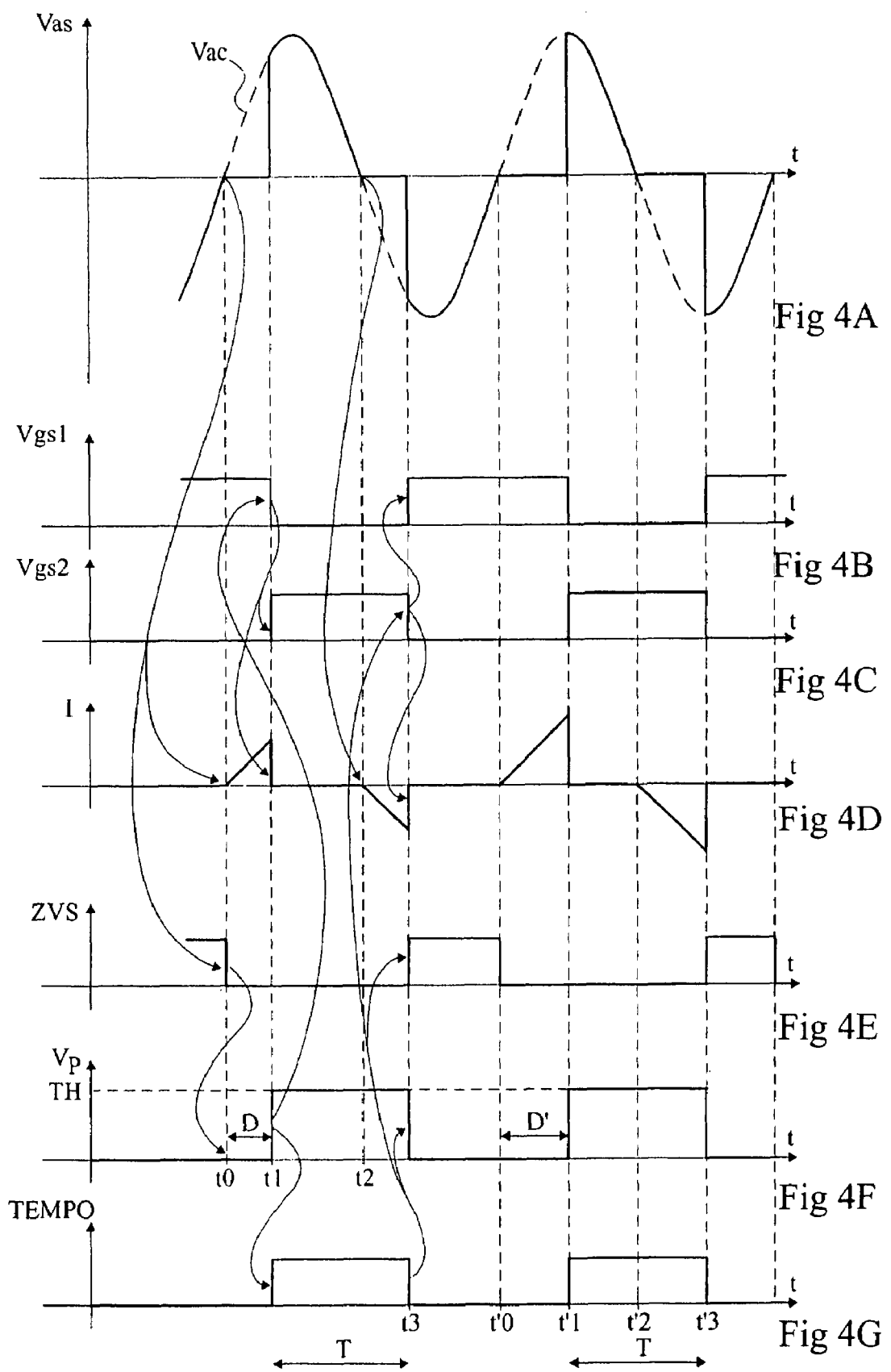
FIGS. 4A to 4G illustrate, in simplified timing diagrams, the operation of a dimmer according to the present invention.

In the example of FIG. 4, it is assumed that the value of potentiometer P has been modified at time t0', so that time t1' is delayed by a time D' greater than time D with respect to time t0'. This results in a longer circuit conduction period, and thus in a greater power in the load. Dwell T remains fixed.

It should be noted that, although it is not compulsory for dwell T to exactly correspond to the supply voltage half period, this is a preferred embodiment since it makes the conduction periods of transistors 11 and 12 symmetrical.

An advantage of the present invention is that by using RB-IGBT transistors, it is now possible to use a single comparator to generate a gate signal used, by state inversion, for the control of the two transistors.

Figure 5:
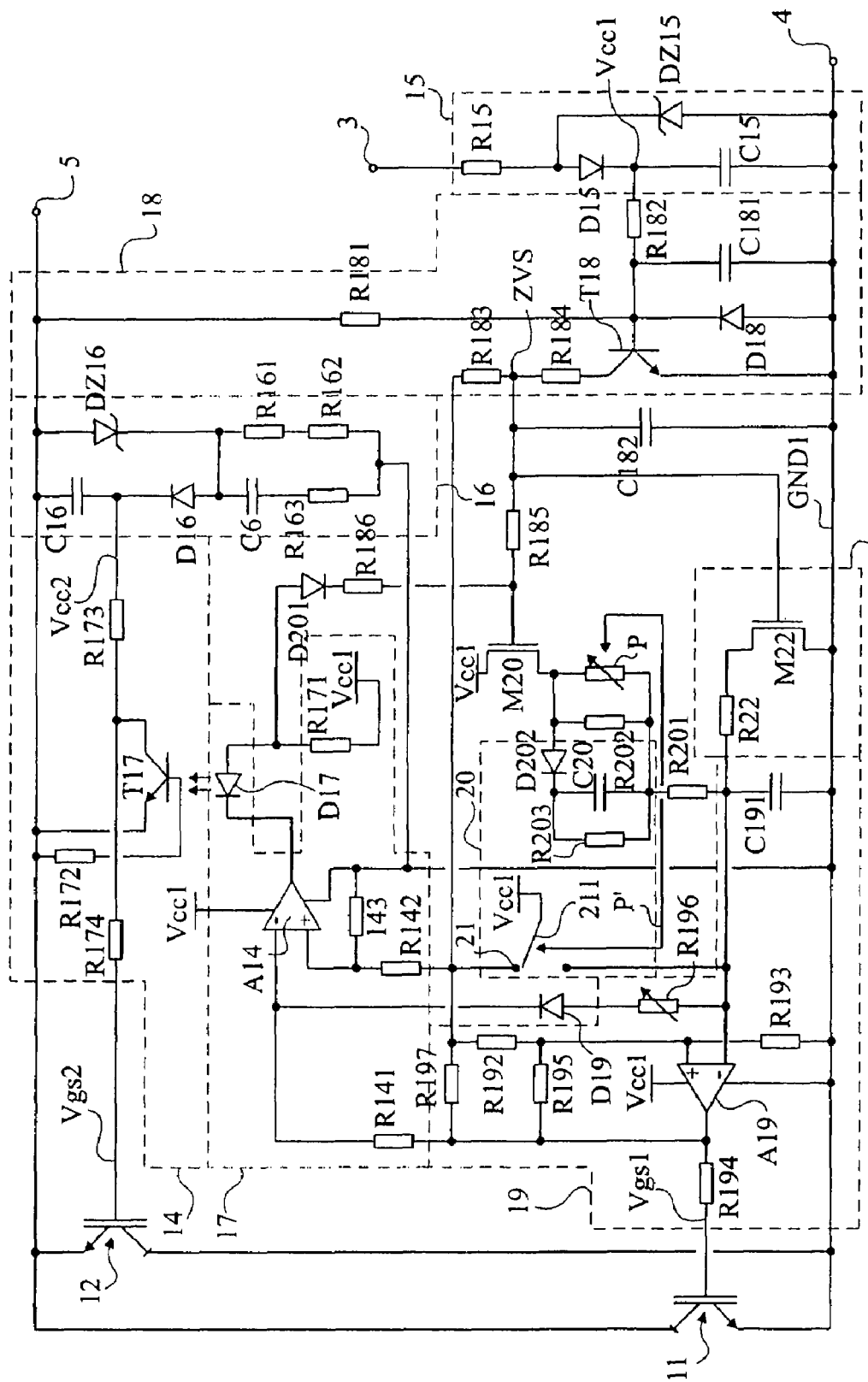
FIG. 5 is an example of a detailed electric diagram of a power dimmer according to the present invention.

FIG. 5 shows an example of practical implementation of a power dimmer circuit according to the present invention. This drawing will be described in relation with the elements described in the previous drawings.

Voltage zero detection circuit 18 has a structure which is conventional per se. It comprises a bipolar NPN-type transistor T18 having its base connected by a resistor R181 to terminal 5 of connection to the load, and by a diode D18 to neutral 4 of A.C. voltage Vac, the anode of diode D18 being connected to terminal 4 so that only the zero crossings towards positive halfwaves are taken into account by the base of transistor T18. The base of transistor T18 is further connected, via a resistor R182, at the point at which voltage Vcc1 is supplied to circuit 15, to maintain the saturation of transistor T18 even when the voltage between terminals 4 and 5 is low (this resistance may be eliminated for a control on an RL load). Transistor T18 turns off as soon as voltage Vas becomes much greater than zero. Circuit 15 is in accordance with that described in relation with FIG. 2. A capacitor C181 is connected in parallel on diode D18. A capacitor C181 is optional and is used to immunize the base of the transistor against disturbances generated by voltage Vas. The emitter of transistor T18 is directly connected to terminal 4 while its collector is connected by a series association of two resistors R183 and R184 to a point 21 of application of voltage Vcc1 when the circuit is on. Signal ZVS is sampled at the junction point of resistors R183 and R184. This point (noted as ZVS) is connected, by a resistor R185 of high value, to the gate of a MOS transistor M20 constitutive of starting circuit 20. An optional capacitor C182 for immunizing transistor T18 against noise connects point ZVS to terminal 4.

Circuit 20 will be described in detail hereafter. For the time being, it is sufficient to note that, when, transistor M20 having its source at voltage Vcc1 is turned on, by the turning-on of transistor T18 due to the forward biasing of diode D18, it provides current to potentiometer P which takes part, through a resistor R201, to the charge of a capacitor C191 conditioning voltage Vp. Capacitor C191 is connected between an inverting input of an operational amplifier A19 assembled as a comparator and neutral 4.

Simultaneously to the turning-on of transistor M20, signal ZVS turns off a transistor M22 constitutive of a circuit 22 of discharge of capacitor C191 (time t3, FIG. 4). Transistor M22 is series-connected with a resistor R22 between the inverting input of amplifier A19 and neutral 4. It enables fast switching of output voltage Vgs1 of comparator A19. The non-inverting input of comparator A19 is connected to the midpoint of a resistive dividing bridge formed of resistors R192 and R193 in series between point 21 of application of voltage Vcc1 when the circuit is on and terminal 4. A resistor R195 forms the feedback of comparator A19 by connecting its output to its non-inverting input, and sets with resistor R192 a switching hysteresis of comparator A19. The output of amplifier A19 is connected by a resistor R194 to the gate of transistor 11 and, by a resistor R197, to point 21.

The output of comparator A19 is connected by a resistor R141 to the inverting input of an amplifier A14 assembled as a level shifter. The non-inverting input of amplifier A14 is connected to the midpoint of a resistive dividing bridge formed of resistors R142 and R143 in series between point 21 of application of voltage Vcc1 and neutral 4. The selection of the resistance values for a proper switching of this inverter is within the abilities of those skilled in the art. Amplifiers A19 and A14 are supplied by voltage Vcc1 provided by circuit 15.

Dwell TEMPO by a half-period of the A.C. power supply is obtained by means of the same capacitor C191 which provides the variable dwell and of a resistor R196 preferentially formed of a potentiometer, to be able to set this dwell according to the frequency of the A.C. power supply. Potentiometer R196 connects the inverting input of amplifier A19 to the inverting input of amplifier A14 by being in series with a diode D19. When signal Vgs1 is at zero, capacitor C191 discharges through resistor R196.

It can be seen that a single comparator A19 is used for the two dwells (variable and fixed). The first dwell (threshold TH) is conditioned by potentiometer P, resistor R201, and capacitor C191. When the comparator switches, it imposes a zero state on the inverting input of amplifier A14. This starts the discharge of capacitor C191 into resistor R196, up to a threshold set by resistors R192, R193, R195, and R197.

The output of amplifier A14 is connected to isolator 17 formed of an optocoupler. The optocoupler has been shown in detail in FIG. 5 to illustrate its biasing. The output of amplifier A14 is connected to the cathode of emitting diode D17 having its diode biased by a resistor R171 to voltage Vcc1. Phototransistor T17 of the optocoupler has its emitter directly connected to terminal 5, its base connected by a biasing resistor R172 also to terminal 5. The collector of transistor T17 is connected to the junction point of resistors R173 and R174 in series between the supply point of voltage Vcc2 (output of circuit 16) and the gate of transistor 12. It can be seen that as soon as transistor 17 is off, a gate voltage Vgs2 is applied on the gate of transistor 12. Conversely, when emitting diode D17 turns on transistor T17, said transistor short-circuits the gate and source of transistor 12.

A resistor R186 connects, by a diode D201, the anode of diode D17 to the gate of transistor M20. Resistor R186 is used to block transistor M20 to enable discharge of capacitor C191 when amplifier A14 switches. This switching is detected by diode D201.

The junction point of resistors R185 and R186 is connected to the gate of transistor M20 of the starting circuit. This starting circuit comprises, in parallel with potentiometer P and a resistor R202 used as a stop (and thus between the drain of transistor M20 and resistor R201), a diode D202 in series with the parallel association of a capacitor C20 and of a resistor R203, the anode of diode D202 being connected to the drain of transistor M20.

It is assumed, in the shown example, that the potentiometer has a turn-on/turn-off function which conditions (arrow P') the position of a switch 211 of the starting circuit connecting supply terminal Vcc1, either to point 21 when the circuit must be turned on, or to the inverting input of amplifier A19 when it must be turned off.

Circuit 20 operates as follows. Capacitor C20 is initially discharged. This short-circuits potentiometer P and thus provides a low conduction time upon circuit turning-on. This conduction time increase as capacitor C20 progressively charges at each conduction cycle, to reach a value set by potentiometer P. Resistor R202, which may be a potentiometer, is used to set the maximum conduction time of the power dimmer. Resistor R201 is used to define a minimum conduction time of the power dimmer and accordingly, the average current available for floating supply voltage Vcc2. When the power dimmer is turned off by the switching of switch 211, capacitor C20 is discharged through resistor 203 to force a slow starting at the next turning-on.

Circuit 16 for providing voltage Vcc2 is completed with respect to the embodiment of FIG. 2 by a cell formed of a resistor R161 in series with a resistor R162, all in parallel with a resistor R163 series-connected with capacitor C6. This cell is used to supply the floating stage, whatever the type of load in series. In particular, in an application where the load is a fluorescent lamp, this avoids untimely charge of the input capacitor of this lamp.

As a specific example of implementation, a circuit such as shown in FIG. 5 has been shown, for an operation on a 60-Hz mains, with the following components.

Operational amplifiers A14 and A19: LM393.
Optocoupler: 4N35-M.
Diodes D15, D16, D18, D19, and D202: MCL4148.
Diodes DZ15 and DZ16: BZV55C16.
Transistor M20: TP0610T.
Resistors: R163: 10 Ω; R174, R184, R186, R194: 1 kΩ; R22: 3.3 kΩ; R201: 15 kΩ; R171: 18 kΩ; R15: 20 kΩ; R203: 30 kΩ; R161, R162: 75 kΩ; R173, R197: 82 kΩ; R141, R181: 100 kΩ; R183: 150 kΩ; R192: 220 kΩ; R195: 330 kΩ; R202: 500 kΩ; R142, R143, R182: 511 kΩ; R185: 1 MΩ; R172: 1.8 MΩ.
Potentiometers: R196: 500 kΩ; P: 560 kΩ.
Capacitors: C182: 1 nF; C181: 10 nF; C6, C191: 33 nF; C16: 4.7 μF; C15, C20: 100 μF.

The only high-voltage capacitor required for the implementation of the present invention is capacitor C6.

An advantage of the present invention is that it avoids use of two high-voltage diodes as in the case of a conventional analog MOS power transistor control system.

Another advantage of the present invention is that the control of the transistors is performed at the supply signal frequency.

Of course, the present invention is likely to have various alterations, modifications, and improvements which will readily occur to those skilled in the art. In particular, the dimensions to be given to the different components is within the abilities of those skilled in the art based on the functional indications given hereabove. Further, other practical embodiments than the preferred embodiment illustrated in FIG. 5 may be envisaged provided to respect the described functionalities. In particular, these functions may be performed by a microcontroller.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A circuit for controlling power in a load supplied by an A.C. supply voltage and directly connected to a first terminal of application of the A.C. supply voltage, comprising:

two isolated-gate bipolar transistors, connected in anti-parallel between a second terminal of application of the A.C. voltage and the load;

means for detecting a zero crossing of the A.C. supply voltage in a first direction;

means for generating, at each period of the A.C. supply voltage, a pulse of a predetermined time duration for controlling a first transistor of said isolated-gate bipolar transistors, a time of occurrence of the pulse being conditioned by the detection of the zero crossing of the A.C. supply voltage and by a desired power reference setting a variable delay of occurrence of the pulse with respect to the detected zero crossing; and means for inverting and transferring said pulse to a second transistor of the isolated-gate bipolar transistors.

2. The circuit of claim 1, wherein said predetermined duration corresponds to a half-period of the A.C. supply voltage.

3. The circuit of claim 1, wherein said inversion and transfer means comprises an optocoupler.

4. The circuit of claim 1, wherein said generation means comprises a comparator providing a signal for controlling the gate of the first transistor, a turning-off of the first transistor is conditioned by said variable delay initialized by said detection means.

5. The circuit of claim 4, wherein said variable delay upon the turning-off of the first transistor is obtained by a resistive and capacitive cell having its resistance conditioned by a potentiometer and having its charge controlled by said detection means.

6. The circuit of claim 5, wherein said pulse of the predetermined time duration is obtained by means of said comparator by a resistive and capacitive discharge of the capacitor setting the variable delay.

7. The circuit of claim 1, further comprising a starting circuit.

8. The circuit of claim 1, wherein the load comprises a resistive and capacitive load, and wherein the occurrence of said pulse turns off said first transistor.

9. The circuit of claim 1, wherein the load comprises a resistive and capacitive load, and wherein the occurrence of said pulse turns on said first transistor.

10. A method for controlling a load supplied by an A.C. voltage and directly connected to a first terminal of application of the A.C. voltage, the method comprising:

detecting a zero crossing of the A.C. voltage in a first direction;

generating, at each period of the A.C. voltage, a pulse of a predetermined time duration for controlling a first transistor in a plurality of reverse-blocking transistors, wherein the plurality reverse-blocking transistors are connected in anti-parallel between a second terminal of application of the A.C. voltage and the load;

inverting the pulse to provide an inverted pulse; and transferring the inverted pulse to a second transistor from the plurality of reverse-blocking transistors for controlling the second transistor.

11. The method of claim 10, wherein the predetermined duration of the pulse corresponds to a half period of the A.C. supply voltage.

12. The method of claim 10, wherein the plurality of reverse-blocking transistors comprise reverse-blocking isolated gate bipolar transistors.

13. The method of claim 10, wherein the first direction comprises a negative-to-positive direction.

14. The method of claim 10, wherein the second transistor is controlled to be turned on at a time when the first transistor is blocked.

15. The method of claim 10, wherein the pulse is generated at a time conditioned upon detection of the zero crossing of the A.C. supply voltage and upon a reference setting a variable delay of occurrence of the pulse with respect to the detected zero crossing.

16. The method of claim 15, wherein a turning-off of the first transistor is conditioned by the variable delay.

17. The method of claim 15, wherein a total of a duration of the predetermined time duration of the pulse and a duration of a maximum of a turn-off delay of the first transistor does not exceed a period of the A.C. supply voltage.

* * * * *